Oct. 25, 1966  B. T. A. HARGÖ  3,281,326
FUEL ELEMENT FOR NUCLEAR REACTORS
Filed March 8, 1963  3 Sheets-Sheet 1

Oct. 25, 1966     B. T. A. HARGÖ     3,281,326
FUEL ELEMENT FOR NUCLEAR REACTORS
Filed March 8, 1963     3 Sheets-Sheet 2

INVENTOR

BY

ATTORNEY

Oct. 25, 1966   B. T. Å. HARGÖ   3,281,326
FUEL ELEMENT FOR NUCLEAR REACTORS
Filed March 8, 1963   3 Sheets-Sheet 3

INVENTOR
Bent Torsten Allan Hargö

BY
ATTORNEY

United States Patent Office 3,281,326
Patented Oct. 25, 1966

3,281,326
FUEL ELEMENT FOR NUCLEAR REACTORS
Bernt Torsten Allan Hargö, Jarvstigen 14, Solna, Sweden
Filed Mar. 8, 1963, Ser. No. 263,931
Claims priority, application Sweden, Mar. 9, 1962, 2,664/62
8 Claims. (Cl. 176—76)

The present invention relates to a nuclear reactor fuel element arrangement, which is particularly adapted for nuclear reactors of the pressurized water type wherein the moderator and coolant consist of heavy water. As will be apparent from the following description, the invention has also other applications.

The fuel in a heavy water reactor usually consists of elongated thin canned rods which are usually disposed vertically in the reactor core in a suitable number. The rods may consist of an integral piece or of a few canned rod portions which are often joined together to form a long rod. Since experience has shown that the specific cost of manufacture of the rods and the degree of difficulty of the refueling arrangements decreases with increasing rod length or fuel element length the latter is usually selected equal to the entire height of the reactor core and the fuel element consists along its elongation usually to 90 to 100% of nuclear material in so few and so long rod portions as possible from the point of view of manufacture. A heavy water reactor for 1,000 megawatts of heat contains about 12,000 rods of an effective length of about 3.5 meters and equal to the height of the core and with an external diameter of about 1 centimeter, if the fuel material consists of uranium oxide. This means, that on an average, a heat rate of about 70 watts per square centimeter shall be dissipated from the peripheral surface of the rods, and approximately twice this value in the central portion of the core.

The total horizontal cross-section area of the 12,000 rods in this example will be slightly below 1 square meter, while the corresponding area of the entire core is about 10 square meters, which means that the horizontal cross-section of the core is formed by about 90 percent of water. The disposition of the rods over the water-rich cross-section must be such as to satisfy the nuclear fission process as well as the heat transport process and at the same time the fuel shall be capable of being exchanged by the most simple possible means. From the point of view of the nuclear fission process, the rods should not be grouped to form a few thick bundles, but such an arrangement would facilitate the refueling. In such a case the roof of the reactor tank could be provided with closure-equipped openings, one over each bundle, so that each bundle could be removed through the associated opening by a longitudinal movement. Furthermore, the cooling water between the rods must flow generally parallel to the rods, since the velocity of flow of the water for an efficient cooling of the fuel should be about 2 meters per second, and with a cross-current flow such a velocity would result in a strong vibration of the rods. It is also important that the flow pressure drop in the coolant passages is low and their disposition such that in the case of a failure of the cooling water pumps the fuel is protectively cooled by self-circulation with vaporization without the coolant passages being blocked by steam and the fuel burnt out. Finally, it is economically very advantageous, that the well-known self-control and steam absorption properties of the moderator are automatically utilized in critical operation situations such as in failure of the pumps and in involuntary power increases. The steam which is then formed in the coolant passages shall be compelled to pass the moderator and to be absorbed therein by condensation. Thereby, the nuclear fission process is automatically reduced and at the same time the steam is prevented from increasing the pressure in the reactor tank to dangerously high levels. A good self-protective cooling capacity, a high degree of self-control and steam condensation in the moderator in operative disturbances generally manifest themselves in generally good operative characteristics with the possibility of high specific power output from the fuel and low requirements for expensive safety systems, both of these properties being necessary for the economic competitiveness of the heavy water reactor.

Hitherto used fuel bundles or fuel element forms of long fuel rods have not simultaneously satisfied the requirements specified above. The most common element form, the guiding tube element, comprising a bundle surrounded by walls which separate the bundle from the moderator and guide the cooling water through the bundle has the advantage of being exchangeable in the manner described above. Due to the fact that the coolant passages are both long and narrow and all debouch above the moderator, the arrangement results in very poor operating characteristics of the reactor. A high pressure drop, a poor self-protecting cooling capacity, the self-control and steam absorption capacity of the moderator unutilized in case of vaporization in the coolant passages, all these factors result in a low fuel power and expensive safety arrangements to such an extent that this form of element is not well suited for high power reactors in spite of the ability of refueling. The homogenized fuel element having the rods so sparsely positioned in the bundle that these are disposed wall to wall in the reactor core, satisfies the above specified requirements for good characteristics in operation disturbances with a minimum of safety arrangements. However, the fuel elements are not exchangeable unless special and difficult refueling methods are employed which differ entirely from the well-known method described above. Furthermore, the cooling water velocity is normally low, only 0.5 to 1 meter per second, due to the fact that the entire water cross-section of the moderator is utilized for coolant passages. This gives rise to problems with the cooling of the fuel rods in the pressurized water reactor.

The object of the present invention is, utilizing substantially well-known and inexpensive fuel rod forms, to provide a fuel element arrangement which unites the requirement for refueling ability by prior art methods with the possibility of high specific fuel power output without causing high requirements for the safety and auxiliary systems of the reactor. Further objects of the invention are that it shall be capable of being applied to several operating reactors adapted for the known guiding tube element in order to improve the power output and operating characteristics of these reactors. Other objects of the invention will be apparent from the following description.

The fuel element of this invention is of elongated shape and is provided with passages for the flow of a coolant in heat exchange relationship to the fuel, the effective portion extending along preferably 9/10 of and most preferably along the whole length of the fuel element. The fuel element is characterized by the fact that a plurality of cooling passages extend longitudinally of the element each over only a portion of the length of the fuel, but so that substantially all the fuel is covered by cooling passages, said cooling passages having their inlets and outlets disposed at several points along the length of the fuel and are all arranged in parallel as regards the flow of the coolant and are each adapted for the flow of a portion of the coolant therethrough longitudinally of the element.

The arrangement of this invention is illustrated by FIGURES 1–4 which relate to a heavy water moderated pressurized water reactor. Like numerals refer to the same members in the four figures.

Figure 1:
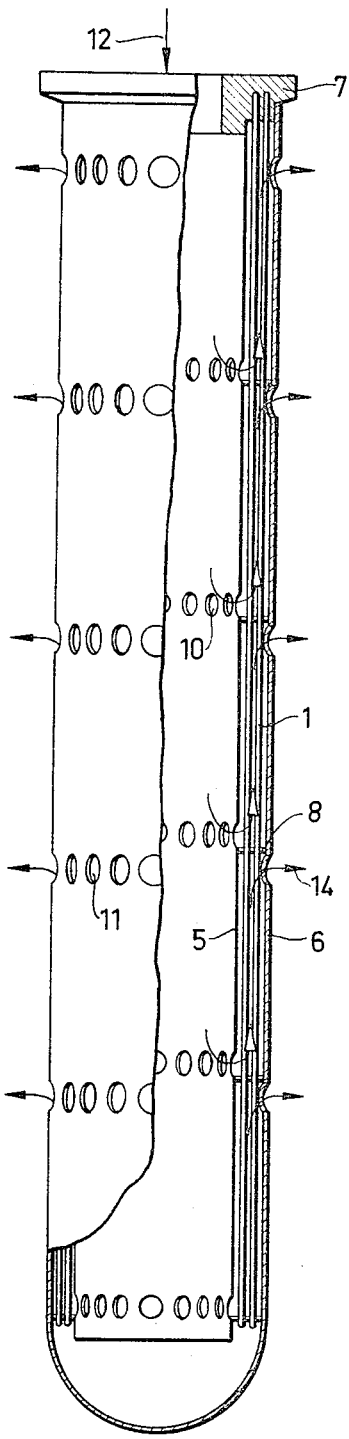
FIGURE 1 shows an elevation, partly in cross-section, of a fuel element.

Referring to the drawings in detail, the fuel rods 1 of known construction have been grouped in a well-known manner into an annular bundle confined between two co-axial guiding tubes 5 and 6. In the example illustrated, 96 rods of length equal to the height of the core have been disposed closely spaced along two circles 2 and 3. The bundle and the guiding tubes are suspended in a known manner in the top plate 7. By a number of partitions 8, five in the example shown, and disposed transverse to the fuel rods in the annular chamber 4, the long cooling passages 9 in the annular chamber are divided in sections separate from each other. Through a number of orifices 10, in the example 16 holes uniformly spaced apart from each other, in the inner guiding tubes 5 and disposed at the lower end of each annular chamber, the cooling water which in this example enters the device at its top end 12 and flows down through the inner guiding tube 5, will be divided into a number of parallel streams, in the example 5 streams, each passing through one of the five coolant passage sections 9 with the main flow direction parallel to the fuel rods 1, and then flow out into the moderator space 13 at different levels 14.

The division of coolant channels 9 into sections does not affect the shape, number or relative disposition of fuel rods in the elongate bundle. They may be integral or joined and be positioned in the lattice by methods known from guiding tube fuel elements of conventional type. The bundle need not be annular, as in the example, but may be of any arbitrary cross-sectional shape. The annular shape is advantageous, however. It gives symmetry, a natural space 15 within the inner guiding tube 5 for supply of cooling water to the various part sections and it accommodates many fuel rods without the thickness of the ring being great. The latter is favorable from the point of view of fuel exchange and from the point of view of nuclear fission. Typical data for the 12,000 fuel rods in the 1,000 megawatt example are that each element comprises about 500 rods disposed along five circles. The annular chamber width will then be 60 millimeters and the diameter of the outer guiding tube hardly 600 millimeters. Thus, the reactor core will consist of only about 20 fuel elements having a total horizontal area of a little above 5 square meters, whereof the annular chamber cross-section takes up about 2 square meters, a half coolant passage cross-section and about a half fuel rod cross-section, all approximate values. This leads to the conclusion that the elements can be refueled in the manner described, since their common cross-sectional area takes up only about a half of the total cross-section of the reactor core.

By the division of the long coolant passages 9 into shorter sections which are passed by parallel partial coolant flow the pressure drop across the fuel bundle is greatly reduced. The reduction for $n$ sections of equal length will be $\Delta P_0/n^3$ where $\Delta P_0$ is the pressure drop along the undivided coolant passage, i.e. the corresponding coolant passage of the conventional guiding tube element. This represents a more than hundredfold reduction in the example with $n=5$. Since the short coolant passage section also has a vertical extension, the element will show excellent self-cooling properties on pump failure. The steam formed in the coolant passages will easily pass out into the moderator and is compelled to flow through it as the steam bubbles will rise. Thereby, the desired self-control and steam absorption capacity of the moderator is rapidly and efficiently utilized. Since the pumps normally circulate a cooling water flow of about 10 cubic meters per second through the whole reactor, the average velocity in the coolant passages will be $10/1\times5=2$ meters per second in the typical example with $n=5$ and a power of 1,000 megawatts. A good cooling of the fuel will thus be guaranteed also under normal operation. If the $n$ value in practical cases is selected between 2 and 20, the division into sections provides the degrees of freedom which always ensure an efficient cooling in spite of a low pressure drop.

Figure 3:
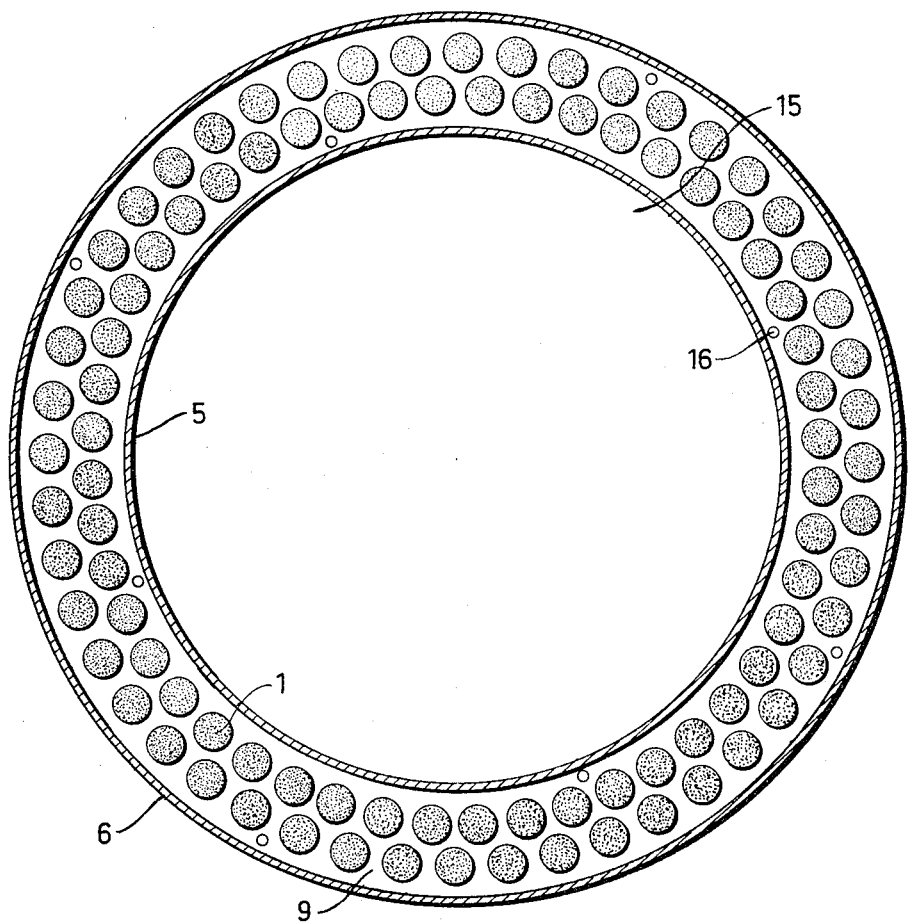
FIGURE 3 shows a cross-section of a fuel element on an enlarged scale.

The spaces 13 and 15 between and within the elements in FIGURE 3 will both contain the moderator. At reactor powers as great as 2,500–3,000 megawatts, the spaces will be of about equal volumes. Thereby or somewhat before it is equivalent in which direction the coolant passes through the fuel bundle between the two spaces. With regard to self-control and steam absorption, however, it is generally most advantageous if the larger of the two spaces is placed after the fuel bundle with respect to the path of flow of the coolant, since this portion is most rapidly utilized when steam is formed in coolant passages 9. If the direction of flow is selected from space 13 to space 15, the orifices 10 and 11 should change levels.

Even if the volumes 13 and 15 are selected equal, the total horizontal cross-sectional area of the fuel elements will in this limiting case be less than ⅔ of the corresponding core cross-section, wherefore the process of charging the reactor through a hole above each element position can always be carried out in practice. The corresponding area ratio can in other cases be ⅕ which shows that the arrangement of this invention is also applicable to present guiding tube reactors which employ the same charging process.

Figure 2:
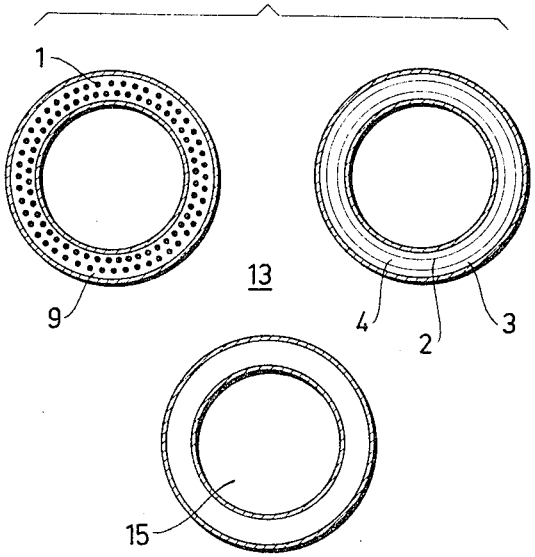
FIGURE 2 shows a horizontal cross-section of three fuel elements disposed adjacent each other in the reactor core, fuel rods being shown in only one of the three elements.

The described fuel element according to FIGURES 1 to 3 extends vertically through the whole core and is supplied with cooling water from above at 12. In principle there is nothing to prevent the element from being disposed substantially horizontally or from extending only partly through the core, e.g. halfway, or from being supplied with cooling water from the opposite end, too.

Figure 4:
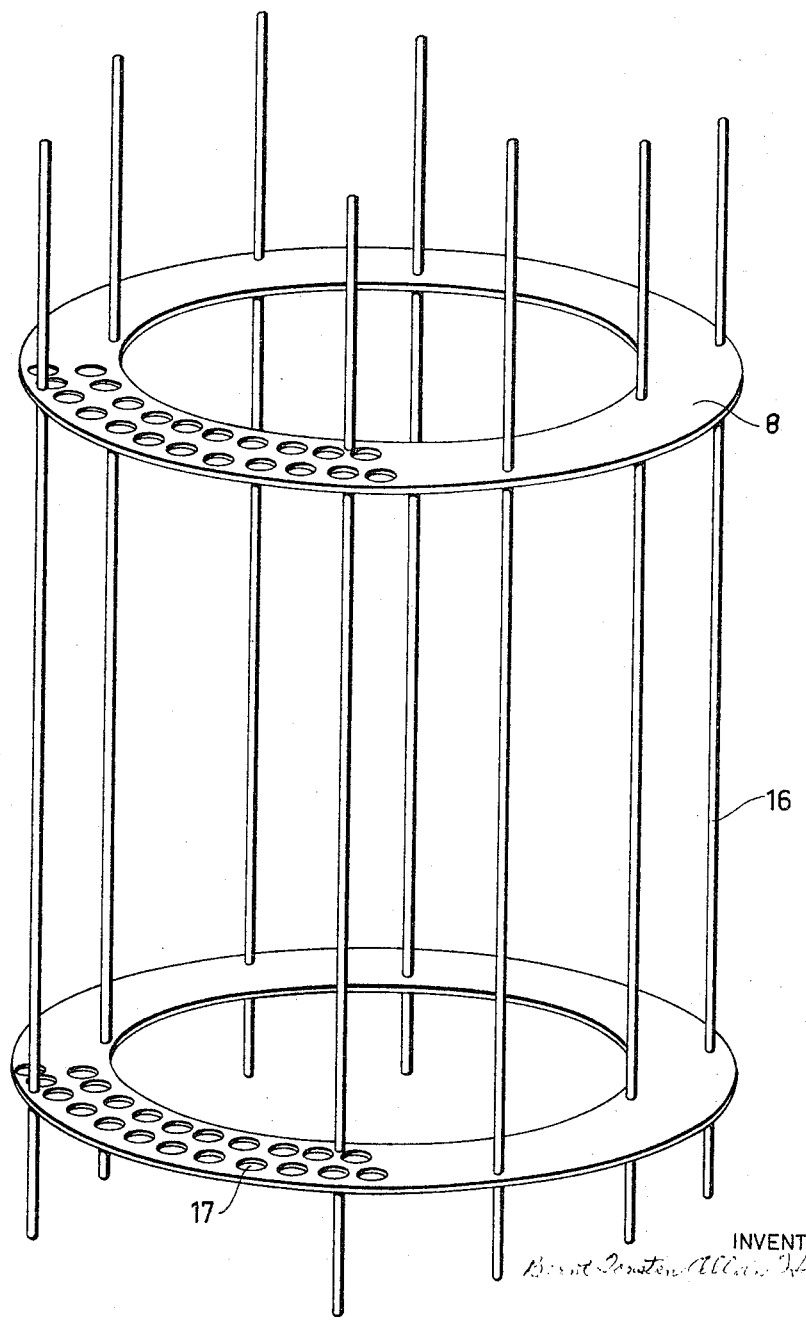
FIGURE 4 shows a detail of a fuel element in perspective view.

FIGURE 4 illustrates an example of the essential feature of the invention, namely the division of the long coolant passages 9 in FIGURES 2 and 3 into sections. Partitions 8, whereof only two are shown in the figure, are of the same shape as the cross-section of the annular chamber 4, are attached to thin tubes or rods 16, in the example eight, which are disposed between the fuel rods. In the partitions holes 17 (only a few holes are shown in the figure) are provided which correspond to the fuel bundle as regards number, shape, dimension and disposition. The arrangement does not affect the length of the fuel rods according to the inventive idea, but can advantageously be utilized also as spacers for the thin fuel rods 1, in which case it does not exclude spacers of conventional type provided in each length section.

It is obvious that if the fuel shape is such that division of the elongate cooling sections into sections without influencing the length of fuel can be achieved without separate guiding tubes 5 and 6 or partitions 8, e.g. by the canning of fuel being enlarged in different directions to replace said members, this arrangement as well as that of FIGURES 1–4, is within the scope of the invention.

The arrangement described is also applicable to the fuel elements of graphite moderated gas-cooled reactors. In that case, the graphite moderator suitably fills a major portion of the two spaces 13 and 15 in FIGURE 2 and only a clearance along the guiding tubes is free for the cooling gas. The division into sections of the cooling passages 9 does not, in that case, appreciably improve the self-controlling properties of the reactor since these properties are always poor in graphite. It is important, however, that pressure drop gains, as pointed out, are made in the passages of the fuel bundle, since the great pressure drop is an important problem in the reactor type involved. The device can also be refueled as described.

I claim:
1. A fuel element for a nuclear reactor comprising in combination:
   elongate enclosure means defining the outer confines of the fuel element,
   longitudinal partitioning means disposed within said enclosure means defining an elongate clearance space for the accommodation of elongate fuel, disposed longitudinally within said clearance space,
   transverse partitioning means disposed within said elongate clearance space dividing said clearance space into a plurality of longitudinal closed compartments,
   fluid inlet means in an end portion of each of said compartments,
   fluid outlet means in the other end portion of said compartments,
   each of said compartments and its associated fluid inlet and outlet means defining substantially longitudinal fluid passages for the flow of fluid through said substantially longitudinal passages in heat-exchange relation with fuel in said compartments.

2. A fuel element in accordance with claim 1 in which each of said fluid inlet means and said fluid outlet means comprise passage means and in which said elongate enclosure means and said longitudinal partitioning means are elongate guiding tubes, the guiding tube comprising said longitudinal partitioning means providing passage for coolant and communicating with each of said compartments through one of said passage means.

3. A fuel element as in claim 2 in which the elongate clearance space is in the shape of an annular chamber formed by two long straight cylindrical guiding tubes of different diameters disposed coaxially one within the other.

4. A fuel element as in claim 2, wherein the fuel is canned fuel rods disposed within said clearance space, the space between said fuel and said two guiding tubes forming coolant passages.

5. A fuel element as in claim 4 wherein the nuclear fuel rods extend substantially continually along the annular clearance space.

6. A fuel element as in claim 4 in which said coolant passages in said clearance space are divided by a plurality of transverse partitions into coolant passage groups of suitable length, said coolant passages providing communication between the space within the inner guiding tube and the space around the outer guiding tube through orifices provided in the walls of said guiding tube at one end of said cooling passages in the inner tube and at the opposite end of said cooling passages in the outer tube.

7. A fuel element as in claim 6 wherein said partitions are carried by members disposed between the fuel rods in said clearance space.

8. A fuel element for a nuclear reactor comprising in combination:
   (1) a first elongate guiding tube;
   (2) a second elongate guiding tube of smaller cross section than said first elongate guiding tube and disposed within said first elongate guiding tube to define an elongate clearance space therebetween to accommodate elongate fuel disposed longitudinally within said clearance space;
   (3) partitioning means disposed within said elongate clearance space extending between said first and second guiding tubes dividing said clearance space into a plurality of closed compartments extending longitudinally of said fuel element;
   (4) fluid conduit means through said first guiding tube connecting the space around said first guiding tube and one end portion of each of said compartments; and
   (5) fluid conduit means through said second guiding tube connecting the space within said second guiding tube and the other end portion of each of said compartments,
   each of said compartments and its associated fluid conduit means defining substantially longitudinal fluid passages communicating between the space around the first guiding tube and the space within the second guiding tube for the flow of fluid through said substantially longitudinal passages in heat-exchange relation with fuel in said compartments.

References Cited by the Examiner

UNITED STATES PATENTS

| | | | |
|---|---|---|---|
| 2,968,601 | 1/1961 | Evans et al. | 176—83 |
| 3,028,329 | 4/1962 | Mahlmeister | 176—76 |
| 3,070,537 | 12/1962 | Treshow | 176—83 |
| 3,089,837 | 5/1963 | Moore | 176—78 |
| 3,152,049 | 10/1964 | Weisner et al. | 176—40 |

FOREIGN PATENTS

| | | |
|---|---|---|
| 822,180 | 10/1959 | Great Britain. |
| 845,804 | 8/1960 | Great Britain. |
| 882,598 | 11/1961 | Great Britain. |

L. DEWAYNE RUTLEDGE, *Primary Examiner.*

REUBEN EPSTEIN, CARL D. QUARFORTH, *Examiners.*

R. C. LYNE, R. L. GRUDZIECKI, *Assistant Examiners.*